United States Patent Office 3,333,032
Patented July 25, 1967

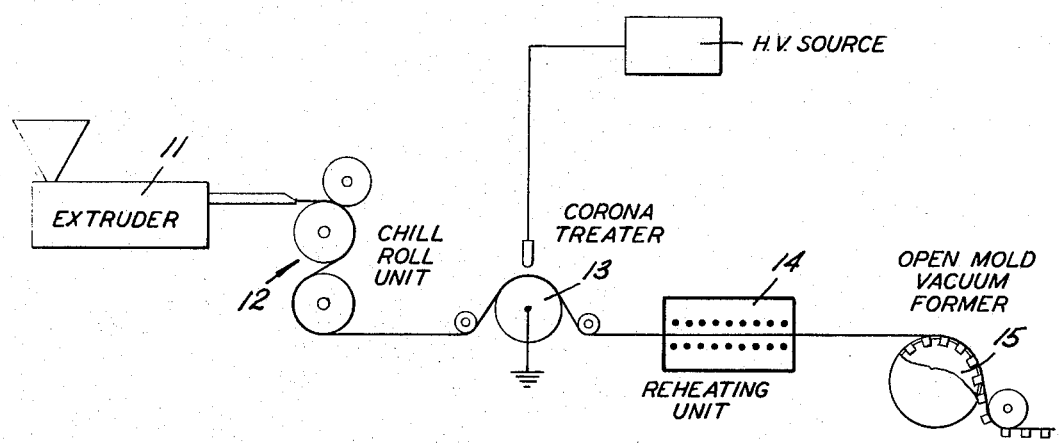

1

3,333,032
TREATED POLYMER SURFACES OF SHAPED ARTICLES
Barry L. Dickinson, South Branch, Somerville, N.J., assignor to Union Carbide Corporation, a corporation of New York
Filed Nov. 12, 1963, Ser. No. 323,101
12 Claims. (Cl. 264—22)

ABSTRACT OF THE DISCLOSURE

Effective corona treatment of polymer surfaces sufficient to retain inks and coatings is found to exist despite severe deformation of the sheet after treatment if the polymer sheet is exposed to corona while hot but below normal thermo-forming temperatures, heating the treated sheet to a thermo-forming temperature and forming the sheet in an open mold to its final shape, even though deformation substantially stretches the treated surface and exposes fresh surfaces. Vacuum forming processes primarily are contemplated, with or without mechanical assists.

---

This invention relates to a technique for the manufacture of shaped thermoplastic polymer articles which are receptive to inks, coatings and the like upon emergence from a forming operation. More particularly it relates to a technique for the corona treatment of polymer surfaces in an intermediate sheet form after which they can be substantially deformed in a mold into the desired shape without loss of the surface treatment.

Heretofore, it has been known that articles made from thermoplastic polymers such as polyethylene, polypropylene, polystyrene and similar resins are not readily receptive to most printing inks, adhesives and the like without surface modification, by means such as corona treatment, flame treatment or exposure to oxidizing solutions which so renders the polymer surface receptive to such inks and coatings. Such treating techniques are relatively easily applied to even shapes such as films and sheets but are employed only with difficulty on odd shaped and large size articles such as bottles, thermoformed cups, food containers, and such irregularly shaped objects. With such formed articles, flame treatment can be employed only with considerable care. For instance, the shape of the flame must be adapted to the shape of the particular article and danger exists in burning up the desired articles if the articles are stopped in the flame area. It is also difficult if not impossible to treat internal surfaces of bottles by flame. Existing corona treating methods have not been practically developed for the treatment of shaped articles which are formed by vacuum forming techniques normally employed to make the containers. The use of oxidizing solutions, while usable in blown articles and deep-drawn vacuum formed articles, has been rarely used since such treating solutions are usually highly corrosive and therefore difficult and dangerous to handle.

In the techniques for the forming of containers or irregular shaped plastic articles such as by vacuum forming, a relatively thick section of thermoplastic polymer in solid condition is formed in an open mold by differential pressure into the desired shape. For example, in vacuum forming a relatively thick sheet of polymer is heated to a forming temperature or an extruded sheet is cooled to such forming temperature and the heated sheet brought in close contact with the mold and is formed in the mold by vacuum applied to the area between the sheet and the

2 mold. Often mechanical assists are employed to secure even draw of the sheet when the vacuum is applied. The differential pressure however is relied upon to conform the sheet to the ultimate shape of the mold. In vacuum forming methods differential air pressure is employed to substantially deform the hot formable plastic into the desired end shape as controlled by the molds. Many end shapes of such formed polymers are possible by such techniques depending, of course, upon the shape of the mold. Completely closed containers can be formed by vacuum forming two matching halves or portions of the container and thereafter heat sealing or gluing the portions together.

Surfaces of such vacuum formed containers are desirably decorated with inks, coatings or the like in order to decorate or protect the container or the ingredients therein, or to reduce the loss of contents through permeation. However, because of the above-mentioned difficulties, treatment of the formed container surface is expensive or accomplished only with considerable difficulty. Quite often the surface treatment is unevenly effected on all portions of the surface and sometimes it is impossible to surface treat the inside of containers after they are formed.

It is therefore an object of this invention to provide a technique for the even treatment of formed containers in order to make them receptive to treating inks, coatings, glues and the like.

It is another object of this invention to provide for an in-line corona treating technique whereby thermoplastic polymer can be extruded, treated, and formed into the desired end shape without requiring separate and distinct operations in order to secure a formed shape that is immediately receptive to inks and coatings.

A further object of this invention is to provide for surface treated polymer objects of odd or irregular shapes whereby the articles are receptive to inks and coatings. Other objects and advantages of this invention will be obvious to those skilled in the art from the following description.

According to the present invention it has now been discovered that thermoformed articles of thermoplastic polymers are now made receptive to printing inks, coatings adhesives and the like on emergence from the forming operation by electrostatically treating under high voltage stress and while in a heated condition substantially above room temperature, the intermediate sheet used in the manufacture of the article, provided that the thermoforming takes place immediately following the electrostatic treatment. Thus the treated polymer surface can be substantially deformed within the confines of an open mold having a surface to be reproduced by the softened polymer, without the loss of effective treatment when the formed polymer cools.

It is remarkably surprising that the stretching and cooling of the polymer surface which takes place during forming retains effective treatment inasmuch as new surfaces are exposed during the substantial stretching during blow molding or deep-draw vacuum forming operations. However, such is not the case provided that the steps herein recited are followed.

The present technique is also most surprising in that it has been found that in order to produce shaped articles of thermoplastic polymers which do not require treatment for ink receptivity after substantial deformation, the polymer intermediate surface must be hot when subjected to corona discharge. Treatment of the polymer intermediate surface when cold, i.e. about room temperature, followed by heating of the intermediate shape to a normal thermoforming temperature and then forming of the article, results in formed pieces which are not ink receptive.

Moreover, it has also been determined that the polymer intermediate surface must be at a temperature below its normal melt extrusion temperature when corona treated, and thereafter the polymer slightly heated to the thermoforming temperature. Treatment at or about the normal melt extrusion temperature has been found to have little or no effect on the polymer surface and articles formed therefrom will not retain effective surface treatment.

Also equally critical in this discovery is the necessity of forming the intermediate polymer sheet or tube into the desired shape by any of the conventional deformation techniques such as vacuum forming, immediately after the treatment and before the polymer cools. Treatment of the polymer even when hot followed by cooling to room temperature and thereafter reheating to a normal forming temperature has been found also to destroy the treatment in that articles formed therefrom do not retain the treatment even though before thermoforming the sheets or tubes readily accepted printing inks and coatings such that they could not be removed by the conventional Scotch tape test.

This phenomenon is not understood and is not readily explained but it is a real and readily employed technique with most polymers needing surface treatment or modification in order to impart the desirable properties. While most all polymers have widely varying melt extrusion temperatures and hence the optimum treating temperature will vary with each, it has been observed that effecting the corona treatment at a temperature of about 20° C. to 150° C. below the normal melt extrusion temperature of the polymer will result in effective retained treatment in the formed articles. In in-line treatment it has been found that greater effective treatment is retained in the articles if the polymer is rapidly cooled or quench-cooled from the normal extrusion temperature to a temperature substantially below the normal extrusion temperature before corona treatment and thereafter the polymer can be reheated by suitable techniques to the normal or desired thermoforming temperature of the polymer.

While the process herein recited is most adaptable to olefin polymers such as polyethylene, polypropylene and polystyrene, it is also readily adaptable for use with any other thermoplastic materials such as polyesters, vinyl chloride polymers and copolymers, polymers of vinylidene halides, polyamides and various copolymers. The olefin polymers generally, however, require such treatment in order to be receptive to inks and coatings. However, other beneficial results are also obtained with different polymers. For example, polystyrene is rendered anti-fogging by such treatment, either with or without the use of such additives and coatings such as the glycerides of fat-forming fatty acids. Vacuum formed or blow molded polyethylene bottles quite often require interior treatment in order that permeation resistant coatings such as phenolic or epoxy resins, or vinylidene chloride polymers can be applied to the surface.

In the method of the present invention, it is contemplated that either one or both surfaces of the formed polymer article can be simultaneously or separately treated. This can be best illustrated in the description of a preferred practice of this invention by reference to the attached drawing in which vacuum formed articles are molded in an in-line operation comprising an extruder, 11, a three-roll chilling unit, 12, a corona treater, 13, a reheating unit, 14, and a vacuum forming unit, 15, complete with molds. The polymer, preferably polyethylene, polypropylene or polystyrene, is melt extruded from the extruder in a 5 to 50 mil sheet and passed through the nip of two of the rolls of the three roll chilling unit and around the middle roll of the unit and then back through the remaining nip and around that roll so that both of the surfaces of the extruded sheet contact the chilling surface to drop the surface temperature to slightly below the normal forming temperature. Thereafter the film passes over the ground roll of the corona treater with the electrode or electrodes mounted about 1/64–1/4 inch away from the roll although the air gap is not narrowly critical. The corona treater is operated at such frequency and power as to provide corona aura contact with the polymer surface. The speed of the unit is adjusted such that the degree of treatment is such as to normally provide the desired degree of ink adhesion if the unit were operated at room temperature. After corona treatment of one side the sheet can be passed through a similar or duplicate unit to treat the other side, if such is desired. The thus treated sheet is then preferably passed into a reheating oven using hot air, radiant heating rods, lamps or even flame to reheat the sheet back to a thermoforming temperature.

If the chilling unit and corona treater are closely mounted and carefully controlled, it is possible to rely only on skin-cooling of the polymer sheet prior to corona treatment. For example, it has been found that on a conventional chill roll extrusion operation using a slot die extruder, corona treatment of the polymer surface after it passes through only the nip of one set of chill rolls and before it is more quickly cooled by contact with another chill roll will still be effective in imparting retention of the ink receptivity to formed articles even when the polymer sheet is subsequently reheated to the forming temperature, provided of course that the thermoforming takes place immediately or in-line and the polymer does not cool down to room temperature.

Thus, as employed herein, the term "reheating said polymer to a normal thermoforming temperature" comprehends both of the techniques of either applying extra heat to polymer mass by separate heating means or by relying on the retained heat in the polymer mass to reheat the corona treated surface.

The source and nature of the corona treatment is not critical in this invention as long as the degree of treatment is sufficient to provide effective treatment of the polymer at room temperatures. Such units providing treatment and the process of employing the corona to modify the surface are well known in the art and are commercially available.

The following examples will serve to illustrate the above-described invention.

*Example 1*

In a series of experiments, a high-density polyethylene having a density of 0.96 and a melt index of 0.2 in the form of sheeting 45–50 mils thick, was corona-treated by the use of a Lepel HFSG–2 electrostatic treating unit. In all experiments the sheets were vacuum formed in a tray mold having a 2½" draw to the bottom of the mold after treatment. The formed trays were then inked with a standard black flexographic ink on the surface which had been treated and exposed to the greatest draw. The adhesion of the ink to the surface of the tray was then checked and rated by the use of the standard Scotch tape test. This test comprises placing a section of pressure sensitive tape, such as the well known "Scotch" tape, firmly on the printed or coated surface after and then quickly pulling the tape off. With good surface treatment little or no ink would be pulled off by the tape. With poor surface treatment, a substantial amount of ink is removed by the tape. In each of the experiments specific conditions were as follows:

(a) The sheeting was corona treated while at room temperature with a setting of 850 watts on the Lepel unit with the electrode 1/8" away from the sheet surface. The speed of the sheet through the corona was maintained at 2.5 ft./min. After treating, the sheet was heated to about 130° C. and vacuum formed in the tray mold and tested for ink adhesion as described above. Little or no adhesion of the ink to the treated surface was noted, indicating that most of the treatment had been lost during the reheating and thermoforming operation.

(b) The polyethylene sheeting was heated to about 130° C. and corona treated at a setting of 1150 watts on the Lepel unit. The electrode was 1/16″ from the sheeting. After treatment the sheet was allowed to cool to room temperature. Forming was accomplished by reheating the treated sheet to about 130° C. and the sheet vacuum formed in the tray mold. Treatment was checked by the ink adhesion test described above. No ink was retained on the surface of the polyethylene sheet that had been treated before forming.

(c) The polyethylene sheeting was corona treated at about 115° C. in an in-line operation following its extrusion at about 260° C. with each side of the sheet passing over about one-half the periphery of a chill roll maintained at about 100° C. to cool the sheet evenly down to the treating temperature of 115° C. The unit was operating at a setting of 1150 watts with the electrode maintained 1/16″ from the sheet. The sheet was passed through the treater at the rate of about 15 ft./min. It was immediately reheated to about 130° C. by passing it through a bank of radiant heater rods and the heated sheet then vacuum formed in the tray mold. It was tested for ink adhesion as described above. The adhesion of the ink was excellent on all the inked surfaces, including end and top panels where the greatest draw occurred.

Example 2

Employing an in-line vacuum forming arrangement similar to that described in Example 1c, 50 mil thick sheeting of a high density polyethylene was only skin-cooled before corona treatment. The extruder formed the intermediate flat sheet at about 260° C. extrusion temperature at a rate of about 15 feet per minute and the sheet passed into the nip between the top two rolls of a three-roll set of chill rolls arranged vertically. All rolls were maintained at about 100° C. The sheeting passed over about one half of the periphery of the middle chill roll and then back around about one-half the periphery of the bottom chill roll, so that both sides of the polymer sheet were evenly cooled to about 110°–120° C.

The electrode of the Lepel treating unit was mounted about 1/16″–1/8″ away from the surface of the middle chill roll so as to corona treat the polymer surface immediately after it passed through the nip of the upper and middle chill rolls. Thus the corona contacted only that surface that had brief contact with the upper chill roll in the nip of the rolls, and which thus was only skin-cooled before treatment to about the temperature of the rolls. The Lepel unit was operated at about 1100–1200 watts so as to develop adequate corona but without arcing to the machine parts.

The sheet was, as in Example 1c, also reheated to about 130° C. after leaving the chilling roll unit and formed by the vacuum former into deep drawn trays. Ink adhesion was excellent on all surfaces by the Scotch tape test, including on those surfaces that had been subjected to the greatest draw.

Equivalent results are secured in these examples using polypropylene or polystyrene. Other thermoplastic polymers can also be readily treated by this technique.

The above described examples illustrate that considerable latitude is possible in the location of the corona discharge as well in the surface temperature of the intermediate polymer form before it is substantially deformed in the mold, as long as the surface temperature is substantially below the normal extrusion temperature but above normal room temperature, and that the thermoforming operation takes place immediately after the corona treatment, allowing of course for intermediate cooling, if desired, and subsequent reheating to the desired thermoforming temperature. However, such examples should be considered as illustrative only of several of the embodiments of this invention and not as a showing of every possible embodiment of this invention. Other embodiments and applications of this invention will be obvious to those skilled in this art from the foregoing description. For example, while the invention has its demonstrated effect in the techniques of blow molding and vacuum forming techniques for securing substantial deformation of the treated hot intermediate shape can also be employed. Also, while it has been demonstrated that molds can be employed in this invention, their use or size is not critical. In blow molding for example, it is possible to free-blow the parison, i.e., without benefit or need of a defining mold if close control over the ultimate size or shape is not of predominant importance. Likewise sheets or films of polymers may be deformed by employment of differential air pressure or mechanical assists or both if such is desired. All of such techniques are contemplated in this invention.

What is claimed is:

1. A process for the manufacture of shaped thermoplastic articles which are receptive to inks and coatings upon emergence from a forming operation comprising the steps of electrostatically treating, under high voltage stress sufficient to initiate corona discharge, at least one surface of a normally solid thermoplastic polymer sheet in a heated condition substantially above room temperature but below the normal thermoforming temperature of said thermoplastic, and immediately thereafter heating said treated thermoplastic surface to a normal thermoforming temperature and substantially deforming the thus treated sheet in an open mold into the desired end shape of the thermoplastic article.

2. The process as defined in claim 1 wherein the substantial deformation is secured within the confines of a mold defining the desired shape of the article.

3. The process as defined in claim 1 wherein the deformation is accomplished by differential fluid pressure applied to the treated intermediate shape.

4. The process as defined in claim 1 wherein the surface temperature of the intermediate form is from 20° C. to 150° C. below the extrusion temperature of the polymer.

5. The process as defined in claim 4 wherein the thermoplastic polymer is a polyolefin.

6. A process for the manufacture of shaped thermoplastic articles which are receptive to inks and coatings upon emergence from a forming mold comprising the steps of melt extruding an intermediate sheet of a normally solid thermoplastic polymer, cooling at least one surface of the intermediate sheet to an elevated temperature substantially below the extrusion temperature, contacting the cooled surface of the intermediate sheet to a corona discharge, reheating the thus treated surface of the intermediate sheet to a normal thermoforming temperature, and substantially deforming the thus treated sheet within the confines of an open mold by the application of differential fluid pressure to the treated sheet to form the desired end shape of the thermoplastic article.

7. The process as defined in claim 6 wherein the surface temperature of the sheet is from 20° C. to 150° C. below the extrusion temperature before it contacts the corona.

8. The process as defined in claim 6 wherein the thermoplastic polymer is a polyolefin.

9. The process as defined in claim 8 wherein the thermoplastic polymer is polyethylene.

10. The process as defined in claim 6 wherein the reheating is accomplished by the retained heat within the polymer sheet.

11. The process as defined in claim 6 wherein the reheating is accomplished by the application of external heat to the polymer sheet.

12. The process as defined in claim 6 wherein both surfaces of the extruded sheet are cooled before being contacted with the corona discharge.

References Cited

UNITED STATES PATENTS

| | | | |
|---|---|---|---|
| 3,017,339 | 1/1962 | Dewey | 264—22 |
| 3,061,882 | 11/1962 | Wolinski | 264—22 |
| 3,106,441 | 10/1963 | Harrison | 264—22 |
| 3,182,103 | 5/1965 | Blaylock | 264—22 |

FOREIGN PATENTS 920,860   3/1963   Great Britain.

OTHER REFERENCES

Plastics Engineering, Guide to Corona Film Treatment, modern plastics, vol. 38, No. 9, May 1961, pp. 199–206.

ROBERT F. WHITE, *Primary Examiner.*

R. B. MOFFITT, *Assistant Examiner.*